United States Patent Office 2,852,518
Patented Sept. 16, 1958

2,852,518

DI-SUBSTITUTED QUINOLINE COMPOUNDS

Marcus S. Morgan, Pittsburgh, Pa., assignor to Parke, Davis & Company, Detroit, Mich., a corporation of Michigan No Drawing. Continuation of application Serial No. 367,077, July 9, 1953. This application May 23, 1957, Serial No. 661,045

3 Claims. (Cl. 260—286)

This invention relates to 6-β-hydroxyethoxy-8-diisobutylaminoethylaminoquinoline and its acid addition salts and to methods for preparing the same. 6-β-hydroxyethoxy-8-diisobutylaminoethylaminoquinoline in its free base form has the formula,

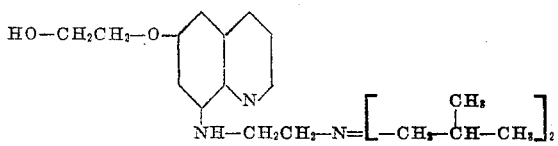

This compound and its non-toxic acid addition salts such as the hydrochloride, sulfate, nitrate, phosphate, p-toluene sulfonate, citrate and the like are not only effective against schistosoma but also sufficiently non-toxic to permit their use in the treatment of schistosomiasis. This is in marked contrast to 6-methoxy-8-diisobutylaminoisopropylaminoquinoline and 6-methoxy-8-diisobutylaminoethylaminoquinoline [Bieter et al., Fed. Proc., 8, 275 (1949)] which proved extremely effective against schistosoma but too dangerous to study clinically due to their great tendency to cause cardiac failure when tested in monkeys.

In accordance with the invention 6-β-hydroxyethoxy-8-diisobutylamnioethylaminoquinoline is produced by the reaction of 6-β-hydroxyethoxy-8-aminoquinoline and a β-diisobutylaminoethyl halide. In carrying out the reaction the β-diisobutylaminoethyl halide can be used in either the free base form or in the form of an acid addition salt such as a hydrohalide salt. It is preferable to carry out the reaction in the presence of a weakly basic substance or a buffer such as sodium acetate, sodium bicarbonate, pyridine, disodium phosphate-citric acid and the like to react with the hydrogen halide liberated during the process. As a reaction medium lower aliphatic alcohols and aqueous mixtures of lower aliphatic alcohols are preferred. The temperature of the reaction is not particularly critical and may be varied from slightly above room temperature to about 125° C. Generally speaking, the reaction is carried out at the boiling point of the reaction mixture. The reaction is quite slow and may require anywhere from about six to one hundred and twenty hours for completion. The addition of a small amount of potassium iodide to the reaction mixture catalyzes the rate of the reaction somewhat.

The salts of 6-β-hydroxyethoxy-8-diisobutylaminoethylaminoquinoline are prepared by adding the desired acid to a solution of the free base. The reaction is preferably carried out under anhydrous conditions at room temperature using a solvent such as chloroform, ethanol, isopropanol and the like.

The invention is illustrated by the following example:

Example 1

20.4 g. of 6-β-hydroxyethoxy-8-aminoquinoline, 22.5 g. of β-diisobutylaminoethyl chloride hydrochloride and 16.4 g. of powdered anhydrous sodium acetate are dissolved in 50 ml. of 50% aqueous ethanol. The reaction mixture is refluxed for 72 hours, cooled, filtered and the combined filtrate evaporated to dryness in vacuo. The residue is dissolved by shaking with a two-phase system consisting of 100 ml. of water and 100 ml. of chloroform. The aqueous layer is extracted with three 100 ml. portions of chloroform, the combined chloroform extracts shaken with aqueous potassium carbonate and the chloroform solution dried with anhydrous sodium sulfate. The solvent is removed by distillation in vacuo to obtain a red-black residue. This residue is dissolved in 4 volumes of chloroform at room temperature and four volumes of hexane are slowly added to the solution with shaking. On cooling to 0–5° C., a crop of unreacted 6-β-hydroxyethoxy-8-aminoquinoline crystallizes out and is removed by filtration. The addition of another four volumes of hexane to the filtrate and cooling yields a second crop of the unreacted aminoquinoline which is collected. Another four volumes of hexane is added to the filtrate and the solution cooled to obtain another small crop of unreacted 6-β-hydroxyethoxy-8-aminoquinoline. The mixture is filtered and the filtrate evaporated to dryness to obtain the free base of 6-β-hydroxyethoxy-8-diisobutylaminoethyl-aminoquinoline as a dark red oil. The free base is dissolved in 200 ml. of absolute ethanol and an excess of dry hydrogen chloride bubbled through the solution. On cooling the solution a crop of the yellowish-orange crystalline dihydrochloride salt is obtained. Further crops may be obtained by the addition of ether to the solution and cooling. This product which is 6-β - hydroxyethoxy-8-diisobutylaminoethylaminoquinoline dihydrochloride of formula,

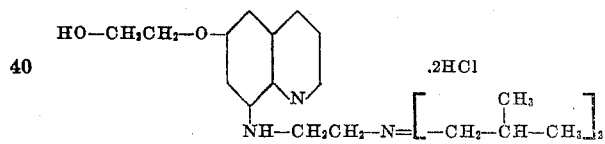

is a yellow crystalline solid readily soluble in water; M. P. 204–205° C.

Other mineral acid salts of 6-β-hydroxyethoxy-8-diisobutylaminoethylaminoquinoline can be prepared by substituting other mineral acids for the hydrogen chloride used in the above procedure.

The 6-β-hydroxyethoxy-8-aminoquinoline used as a starting material in the practice of the invention can be prepared as described in J. Am. Chem. Soc., 68, 781 (1946).

This application is a continuation of my copending application Serial No. 367,077, filed July 9, 1953, now abandoned.

What I claim is:

1. A compound of the class consisting of 6-β-hydroxyethoxy-8-diisobutylaminoethylaminoquinoline and non-toxic acid addition salts thereof.

2. 6 - β - hydroxyethoxy - 8 - diisobutylaminoethylaminoquinoline.

3. 6 - β - hydroxyethoxy - 8 - diisobutylaminoethylaminoquinoline dihydrochloride.

References Cited in the file of this patent

Wiselogle: Survey of Anti-Malarial Drugs, vol. II, pt. 2, p. 1215 (1946), Edwards-publisher; Michigan.

Morgan: Jour. Am. Chem. Soc., vol. 68, pp. 781–784 (1946).